(12) United States Patent
Kizhakkiniyil et al.

(10) Patent No.: US 9,800,515 B2
(45) Date of Patent: Oct. 24, 2017

(54) MECHANISM FOR CONTROLLING A PROCESS ON A COMPUTING NODE BASED ON THE PARTICIPATION STATUS OF THE COMPUTING NODE

(71) Applicant: Apollo Education Group, Inc., Phoenix, AZ (US)

(72) Inventors: Sajithkumar Kizhakkiniyil, Pleasanton, CA (US); Jeevan Pingali, Bangalore (IN); Narender Vattikonda, San Jose, CA (US); Rahul Kumar, Bangalore (IN); Krishnam Chapa, Bangalore (IN)

(73) Assignee: Apollo Education Group, Inc., Phoenix, AZ (US)

( * ) Notice: Subject to any disclaimer, the term of this patent is extended or adjusted under 35 U.S.C. 154(b) by 120 days.

(21) Appl. No.: 14/170,158

(22) Filed: Jan. 31, 2014

(65) Prior Publication Data

US 2015/0222506 A1    Aug. 6, 2015

(51) Int. Cl.
*G06F 15/173* (2006.01)
*G06F 15/16* (2006.01)
(Continued)

(52) U.S. Cl.
CPC ............... *H04L 47/70* (2013.01); *G06F 9/00* (2013.01); *H04L 43/08* (2013.01); *H04L 43/0817* (2013.01); *H04L 67/1004* (2013.01)

(58) Field of Classification Search
CPC ...... H04L 43/08; H04L 47/70; H04L 67/1004
(Continued)

(56) References Cited

U.S. PATENT DOCUMENTS 6,269,396 B1 * 7/2001 Shah ................... H04L 43/0823
709/223
6,857,004 B1 * 2/2005 Howard ................ G06F 9/5044
709/201
(Continued)

*Primary Examiner* — Bharat N Barot
(74) *Attorney, Agent, or Firm* — Hickman Palermo Becker Bingham LLP

(57) ABSTRACT

A mechanism is provided for controlling a process on a computing node. In one implementation, a determination is made as to whether the participation status of a computing node has changed. The participation status may, for example, be active, in which case the computing node is participating in the processing of requests from a request handler, or it may be passive, in which case the computing node is not participating in the processing of requests from the request handler. In response to a determination that the participation status of the computing node has changed from a current status to a new status, one or more processes on the computing node may be caused to begin or halt processing, in accordance with the new status. For example, if the current status is passive and the new status is active, a process on the computing node may be caused to begin processing. On the other hand, if the current status is active and the new status is passive, the process on the computing node may be caused to halt processing. Doing so helps to ensure that a process (such as a self-initiated process) executing on a passive node will not perform any processing that may lead to incorrect or inconsistent results, or even worse, to system corruption or failure.

22 Claims, 3 Drawing Sheets

(51) Int. Cl.
*H04L 12/911* (2013.01)
*H04L 29/08* (2006.01)
*H04L 12/26* (2006.01)
*G06F 9/00* (2006.01)

(58) Field of Classification Search
USPC .................................. 709/202–203, 223–224
See application file for complete search history.

(56) References Cited

U.S. PATENT DOCUMENTS

| | | | |
|---|---|---|---|
| 7,203,509 B2* | 4/2007 | Gottschalk | H04W 4/10 370/296 |
| 8,296,434 B1* | 10/2012 | Miller | H04L 67/1004 709/224 |
| 2010/0223364 A1* | 9/2010 | Wei | H04L 67/1004 718/1 |
| 2013/0046874 A1* | 2/2013 | Cohn | H04L 41/00 709/223 |
| 2013/0169742 A1* | 7/2013 | Wu | H04N 7/152 348/14.08 |
| 2014/0152757 A1* | 6/2014 | Malegaonkar | H04L 67/22 348/14.01 |
| 2015/0172104 A1* | 6/2015 | Brandwine | H04L 41/064 709/224 |

\* cited by examiner

MECHANISM FOR CONTROLLING A PROCESS ON A COMPUTING NODE BASED ON THE PARTICIPATION STATUS OF THE COMPUTING NODE

FIELD OF THE INVENTION

The present invention relates generally to computing systems and more particularly to a mechanism for controlling a process on a computing node based on the participation status of the computing node.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many of today's large scale computing systems comprise a plurality of computing nodes and a request handler. The request handler receives processing requests from external entities (such as client computers), determines which services are being requested by the requests, determines which computing nodes provide the requested services, and then routes the requests to the appropriate computing nodes for processing. In performing this request routing function, the request handler may also perform other functions, such as load balancing to ensure that the load is spread evenly across the various computing nodes.

A request handler often maintains a list of computing nodes. This list includes all of the nodes that have been registered with the request handler; hence, this list represents the nodes that the request handler is aware of. The list of nodes may include active and passive nodes. An active node is a node that the request handler considers to be actively participating in the processing of requests; thus, an active node is a node to which the request handler may forward service requests. A passive node is a node that the request handler considers to not be actively participating in the processing of requests. A passive node may, for example, be a node that is currently unhealthy or is partially or completely malfunctioning. The request handler will not forward requests to a passive node. During operation, an active node may become a passive node, and a passive node may become an active node. For example, if an active node malfunctions or becomes unhealthy, it may be changed to a passive node. Conversely, if a previously malfunctioning or unhealthy node becomes healthy, it may be changed to an active node. Thus, the status of a node may change.

In addition to the nodes that the request handler is aware of, a large scale computing system may further comprise additional nodes. Additional nodes may be included in the large scale computing system for a number of reasons. For example, the additional nodes may serve as rollback nodes. That is, the nodes that the request handler is currently aware of and currently forwarding requests to may run a current version of software while the rollback nodes may run a previous version of the software. Should problems be experienced with the current version of the software, the rollback nodes may be substituted for the currently used nodes to "rollback" to the previous version of the software. This rollback may be achieved, for example, by replacing the list of nodes currently used by the request handler with a new list of nodes that includes the rollback nodes.

Another reason additional nodes may be included in a large scale system is to prepare to launch a new version of software. For example, a new version of software may be installed and executed on a set of upgrade nodes. The software may be configured, tested, etc., on the upgrade nodes until it is ready to go live. At that point, the upgrade nodes may be substituted for the nodes currently used by the request handler. This may be achieved, for example, by replacing the list of nodes currently used by the request handler with a new list of nodes that includes the upgrade nodes. For these and other reasons, a large scale system may include nodes in addition to the nodes that the request handler is currently aware of. Since the additional nodes are not actively being used by the request handler to process requests, they are considered to be passive nodes. Thus, a passive node may be a node that the request handler is aware of, or an additional node that the request handler is not aware of.

A passive node may have a plurality of processes executing thereon. These processes may be of various types, including a request-processing type and a self-initiated type. A request-processing type of process is one that is invoked when a request is received from the request handler. Since the request handler will not forward requests to a passive node, this type of process on a passive node will most likely not perform any processing. A self-initiated type of process is one that performs processing even when no request is received from the request handler. Examples of this type of process include, for example, a process that wakes up periodically to perform some processing, a process that periodically polls a message queue for messages and processes those messages, etc. This type of process may perform processing even if it is running on a passive node and even when the passive node is not receiving any requests from the request handler.

Generally, a process on a passive node should not perform any processing that may affect the operation of the active nodes or the transactions being processed by the active nodes as that may lead to system inconsistency and corruption. For example, as noted above, a passive node may be running a different version of software than the active nodes that are currently being used by the request handler. Also, a passive node may be unhealthy or malfunctioning. Furthermore, a passive node may not be fully and properly configured. That being the case, if a process on a passive node performs processing that affects the active nodes or the transactions being processed by the active nodes, it may very well lead to incorrect or inconsistent results, or even worse, to system corruption or failure.

As noted above, a self-initiated type of process may perform processing even if it is running on a passive node and even when the passive node is not receiving any requests from the request handler. As result, this type of process (and perhaps other types of process) on a passive node may give rise to adverse and potentially grave consequences. Hence, a mechanism is needed to control the operation of this type (and perhaps other types) of process.

DETAILED DESCRIPTION OF THE EMBODIMENT

Overview

In accordance with one embodiment of the present invention, a mechanism is provided for controlling a process on a computing node. In one embodiment, a determination is made as to whether the participation status of a computing node has changed. The participation status may indicate whether the computing node is participating in the processing of requests from a request handler. The participation status may, for example, be active, in which case the computing node is participating in the processing of requests from the request handler, or it may be passive, in which case the computing node is not participating in the processing of requests from the request handler. In response to a determination that the participation status of the computing node has changed from a current status to a new status, one or more processes on the computing node may be caused to begin or halt processing, in accordance with the new status.

For example, if the current status is passive and the new status is active, then a process on the computing node may be caused to begin processing. On the other hand, if the current status is active and the new status is passive, then the process on the computing node may be caused to halt processing. Doing so helps to ensure that a process (such as a self-initiated process) executing on a passive node will not perform any processing that may lead to incorrect or inconsistent results, or even worse, to system corruption or failure.

The participation status of a computing node may change quickly. This mechanism makes it possible to change the processing of a process quickly to adapt to a change in the participation status of the computing node.

Sample System

Figure 1:
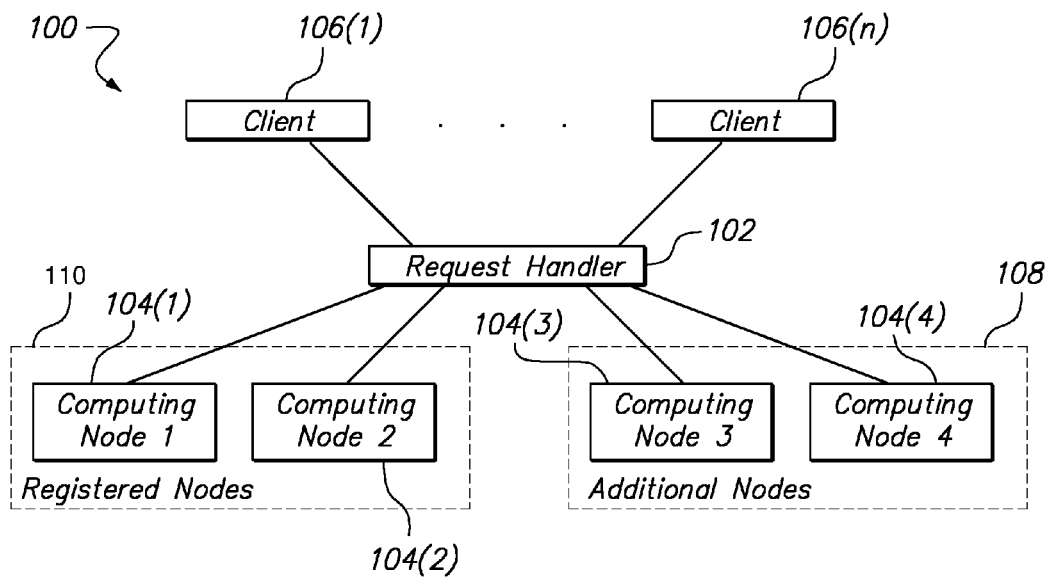
FIG. 1 is a functional block diagram of a system in which one embodiment of the present invention may be implemented.

With reference to FIG. 1, there is shown a functional block diagram of a system 100 in which one embodiment of the present invention may be implemented. As shown, system 100 comprises a request handler 102, a plurality of computing nodes 104(1)-104(4), and a plurality of clients 106(1)-106(n). For referencing purposes, similar elements will be referenced using the same reference number. For example, the reference number 104 is used for all of the computing nodes. This reference number will be used when referring to a computing node generally. When it is desired to refer to a specific computing node, then an additional index will be used. For example, when referring to computing node 1, the reference number 104(1) will be used. This convention will be used for the other elements as well.

For the sake of simplicity, only one request handler 102 and four computing nodes 104(1)-104(4) are shown in FIG. 1. However, it should be noted that system 100 may have any desired number of request handlers 102 and any desired number of computing nodes 104. Also, the request handler 102 is shown in FIG. 1 as being separate from the computing nodes 104(1)-104(4). While it is possible for the request handler 102 to execute on its own separate node, it should be noted that, if so desired, the request handler 102 may execute on one or more of the computing nodes 104(1)-104(4). These and other variations are within the scope of the present invention.

The request handler 102 may be coupled to the clients 106 and computing nodes 104(1)-104(4) via one or more networks (not shown). For purposes of the present invention, the one or more networks may be any type of network, including but not limited to a local area network (LAN), a wide area network (WAN) such as the Internet, an intranet, a wireless network, or any other type of interconnect that enables the various components to communicate with each other.

As shown in FIG. 1, system 100 may comprise a set of registered nodes 110 (in the example shown, the registered nodes 110 include computing nodes 104(1) and 104(2)). In one embodiment, the registered nodes 110 are the nodes that have been registered with the request handler 102; hence, these nodes 110 represent the nodes that the request handler 102 is aware of. In one embodiment, each of the registered nodes 110 has an associated participation status. This participation status indicates whether the computing node is participating in the processing of requests from the request handler 102. In one embodiment, the participation status may be active or passive (other participation statuses may be used as well, if so desired). An active node is a node that the request handler 102 considers to be actively participating in the processing of requests; thus, an active node is a node to which the request handler 102 may forward service requests. A passive node is a node that the request handler 102 considers to not be actively participating in the processing of requests. A passive node may, for example, be a node that is currently unhealthy, that is partially or completely malfunctioning, that has not been fully or properly configured, or that has been determined by the request handler 102 for whatever reason to not be a node that is actively participating in the processing of requests. In one embodiment, the request handler 102 will not forward requests to a passive node. During operation, an active node may become a passive node, and a passive node may become an active node. For example, if an active node malfunctions or becomes unhealthy, it may be changed to a passive node. Conversely, if a previously malfunctioning or unhealthy node becomes healthy, it may be changed to an active node. Thus, the status of a node may change during operation.

In one embodiment, the request handler 102 maintains information indicating which nodes are registered nodes, and which of those nodes are active and passive. This registered node information may include, for example, a node identifier for each registered node and an associated participation status for each registered node. The registered node information may further include a list of services provided by each registered node. The registered node information may be maintained, for example, in a configuration file, a list, a table, a database, or any other type of data structure.

In one embodiment, the request handler 102 may provide some or all of the registered node information upon request. For example, in response to a request from a computing node 104, the request handler 102 may provide some or all of the registered node information to the computing node 104. As will be made clear in a later section, the registered node information may be used by a computing node 104 to determine whether that computing node 104 is an active or passive node. In addition to or in lieu of providing the registered node information to a requester, the request handler 102 may provide the ability for a requester to query the request handler 102 regarding the registered node information. For example, a computing node 104 may send a query to the request handler 102 to inquire whether the computing node 104 is considered by the request handler 102 to be an active or passive node. The request handler 102 may respond with the participation status of the requesting computing node 104. As a further addition or alternative, the request handler 102 may send a notification to a computing node 104 when the participation status of the computing node 104 changes. In these and other ways, the request handler 102 may enable a computing node 104 to ascertain its current participation status with the request handler 102.

System 100 may also comprise a set of additional nodes 108 (in the example shown, the additional nodes 108 include computing nodes 104(3) and 104(4)). In one embodiment, the additional nodes 108 are nodes that have not been registered with the request handler 102. Since the additional nodes 108 are not registered with the request handler 102, the request handler 102 will not forward requests to the additional nodes 108. Thus, in one embodiment, the additional nodes 108 are considered to be passive nodes. In one embodiment, even though the additional nodes 108 are not registered with the request handler 102, they may still communicate with the request handler 102 for various purposes (e.g. to request registered node information from the request handler 102, to query the request handler 102 as to participation status, to receive status change notifications from the request handler 102, etc.).

The additional nodes 108 may be included in system 100 for any number of reasons. For example, one or more of the additional nodes 108 may serve as rollback nodes that execute an older version of software than the registered nodes 110 currently used by the request handler 102 to process requests. Should problems be experienced with the current version of the software, the rollback nodes may be substituted for the registered nodes 110 to "rollback" to the previous version of the software. This rollback may be achieved, for example, by replacing the set of registered nodes 110 in the registered node information with the one or more rollback nodes. As a further example, one or more of the additional nodes 108 may be upgrade nodes that execute a newer version of software than the registered nodes 110 currently used by the request handler 102 to process requests. The software may be configured, tested, etc., on the upgrade nodes until it is ready to go live. At that point, the upgrade nodes may be substituted for the registered nodes 110 currently used by the request handler 102. This may be achieved, for example, by replacing the set of registered nodes 110 in the registered node information with the one or more upgrade nodes. For these and other reasons, system 100 may include nodes 108 in addition to the nodes 110 that have been registered with the request handler 102.

During operation, the request handler 102 receives requests from the clients 106 (for purposes of the present invention, the clients 106 may be any type of device capable of submitting a processing request, including but not limited to a desktop computer, a laptop computer, a tablet computer, a smartphone, a mobile device, etc.). In response to a client request, the request handler 102 determines which service is being requested, determines (e.g. using the registered node information) which of the registered nodes 110 are active and provide that service, and routes the request to one of the registered nodes 110 for processing. In performing the request routing function, the request handler 102 may also perform other functions, such as load balancing to help ensure that the load is spread evenly across the various registered nodes 110. In carrying out the load balancing, the request handler 102 may use any desired load balancing scheme (e.g. round robin, assigning new requests to the node with the lowest workload, etc.).

Figure 2:
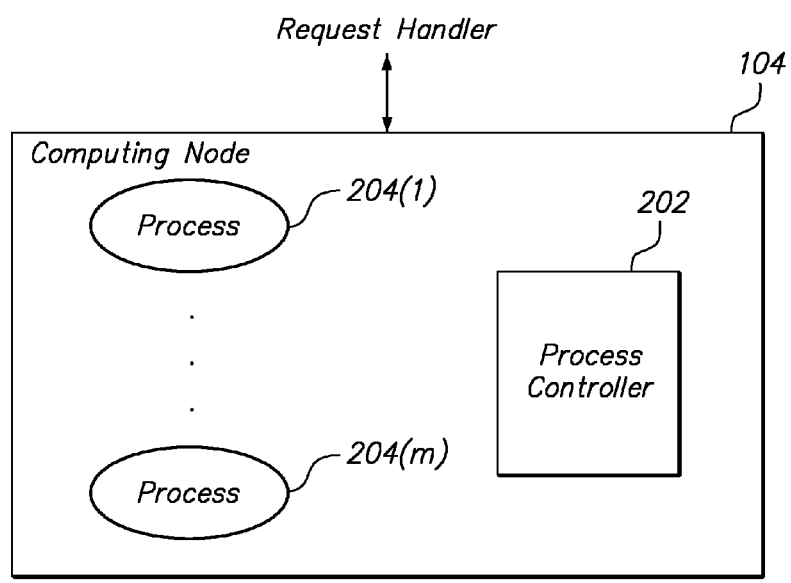
FIG. 2 is a functional block diagram showing a computing node in greater detail, in accordance with one embodiment of the present invention.

With reference to FIG. 2, there is shown a functional block diagram illustrating a computing node 104 in greater detail, in accordance with one embodiment of the present invention. The elements shown in the computing node 104 of FIG. 2 may be implemented in any or all of the registered nodes 104(1), 104(2) and any or all of the additional nodes 104(3), 104(4); thus, any or all of the computing nodes 104 may have a plurality of processes 204(1)-204(m) executing thereon and a process controller 202 for controlling those processes 204(1)-204(m).

The processes 204(1)-204(m) on a computing node 104 may arise, for example, from the execution of one or more sets of software by the computing node 104. The processes 204(1)-204(m) may be of any type. For example, a process 204 may be of a request-processing type, which is invoked when a request is received from the request handler 102. A process 204 may also be of a self-initiated type. This type of process performs processing even when no request is received from the request handler 102. Examples of this type of process include, but are not limited to, a process that wakes up periodically to perform some processing, a process that periodically polls a message queue for messages and processes those messages, etc. These and other types of processes may execute on a computing node 104.

A computing node 104 may also have a process controller 202 executing thereon. In one embodiment, it is the process controller 202 that determines the participation status of a computing node 104, and controls one or more of the processes 204(1)-204(m) accordingly. Specifically, in one embodiment, the process controller 202 determines whether the participation status of the computing node 104 on which the process controller 202 is executing has changed from a current status to a new status. If so, then the process controller 202 causes one or more of the processes 204(1)-204(m) executing on that computing node 104 to begin or halt processing, in accordance with the new status.

In one embodiment, to enable the process controller 202 to control the processes 204(1)-204(m), one or more of the processes 204(1)-204(m) are registered with the process controller 202. In one embodiment, not all of the processes 204(1)-204(m) need to be registered with the process controller 202; rather, only those processes 204 that wish or need to be controlled by the processor controller 202 are registered. The processes that may be registered may include, for example, self-initiated processes that, if executed by a passive node, may cause inconsistent results and system corruption/failure. Other types of processes may be registered as well, if so desired.

Process registration may be performed during initialization of the computing node 104, when a new set of software is executed, or at various other times. In one embodiment, when a process 204 is registered with the process controller 202, a process identifier for the process 204 is provided, along with one or more references to one or more callback functions associated with the process 204. The one or more callback functions will be invoked by the process controller 202 when a change in the participation status of the computing node 104 is detected. In one embodiment, the one or more callback functions comprise the logic for causing the associated process 204 to begin or halt processing. For purposes of the present invention, any number of callback functions may be registered in association with a process 204. For example, a single callback function may be registered for a process 204. In such a case, the same callback function will be invoked by the process controller 202 regardless of whether the participation status of the computing node 104 has changed from active to passive or passive to active, which means that the callback function has sufficient logic to know when to cause the associated process 204 to begin processing, and when to cause the associated process 204 to halt processing, depending upon the change in participation status (in such a case, the process controller 202 may provide the new status as an input parameter to the callback function).

Alternatively, multiple callback functions may be registered in association with a process 204, with one callback function being the one that is invoked when the participation status of the computing node 104 changes from active to passive, and another callback function being the one that is invoked when the participation status of the computing node 104 changes from passive to active. In such a case, the process controller 202 will determine which callback function to invoke based upon the change in participation status. These and other variations are within the scope of the present invention.

In performing its process control function, the process controller 202 determines the participation status of the computing node 104 on which it is executing. For purposes of the present invention, this determination may be made in any desired manner. For example, the process controller 202 may request the registered node information from the request handler 102. From this information, the process controller 202 can determine whether the computing node 104 on which the process controller 202 is executing is a registered node (e.g. by determining whether the node identifier of the computing node 104 is included in the registered node information). If the computing node 104 is not a registered node, then the processor controller 202 knows that the computing node 104 is an additional node 108, in which case, the participation status of the computing node 104 is passive. On the other hand, if the computing node 104 is a registered node, then the process controller 202 determines whether the participation status of the computing node 104 in the registered node information indicates active or passive. Based on this determination, the process controller 202 will know whether the participation status of the computing node 104 is active or passive.

As an alternative, the process controller 202 may submit a query (including the node identifier of the computing node 104 on which the process controller 202 is executing) to the request handler 102 to ask the request handler 102 for the participation status of the computing node 104. Based on the reply from the request handler 102, the process controller 202 will know the participation status of the computing node 104.

As a further alternative, the process controller 202 may monitor the requests (if any) received by the computing node 104 from the request handler 102. If the number of requests received during a certain period of time is above a certain threshold, then the process controller 202 may conclude that the participation status of the computing node 104 is active. Otherwise, the process controller 202 may conclude that the participation status of the computing node 104 is passive.

As yet a further alternative, the process controller 202 may receive a notification from the request handler 102 whenever the participation status of the computing node 104 changes. The notification may include the new participation status of the computing node 104.

If so desired, a combination of some or all of these methods may be used to determine the participation status of the computing node 104. For purposes of the present invention, these and other methods may be used by the process controller 202 to ascertain the participation status of the computing node 104.

After determining the participation status of the computing node 104, the process controller 202 may store the participation status as a current status of the computing node 104. At a later time, the process controller 202 may again determine the participation status of the computing node 104. If the newly determined status is the same as the previously stored current status, then the process controller 202 may conclude that the participation status of the computing node 104 has not changed and hence may take no action. However, if the newly determined status is different from the previously stored current status, then the process controller 202 may conclude that the participation status of the computing node 104 has changed to a new status. In such a case, the process controller 202 may store the new status as the current status, and may invoke the appropriate callback functions of the registered processes 204 to cause the registered processes 204 to begin or halt processing, in accordance with the new status. In one embodiment, if the participation status of the computing node 104 changes from passive to active, the registered processes 204 are caused to begin processing. If the participation status of the computing node 104 changes from active to passive, the registered processes 204 are caused to halt processing. In this manner, the process controller 202 can control the processing of processes 204 on a computing node 104 to dynamically adapt to changes in the participation status of the computing node 104.

Sample Operation

With the above sample system description in mind, a sample operation in accordance with one embodiment of the present invention will now be described.

Registration

In one embodiment, to enable a process controller 202 on a computing node 104 to control one or more of the processes 204 executing on the computing node 104, the one or more processes 204 are registered with the process controller 202. Process registration may be performed during initialization of the computing node 104, when a new set of software is executed, or at various other times. As noted previously, not all of the processes 204 executing on a computing node 104 need to be registered with the process controller 202; rather, only those processes 204 that wish or need to be controlled are registered. For example, self-initiated processes (as well as other types of processes) may be registered. Examples of a self-initiated process include, but are not limited to: a process that periodically polls a message queue for messages, removes messages from the message queue, and performs processing in response to the messages; a process that wakes up periodically to perform some processing; a job scheduling process that causes other processes to perform processing; etc. For the sake of illustration, it will be assumed in the following discussion that processes 204(1) and **204(*m*) need to be controlled by the process controller 202; hence, it is these processes 204(1), 204(*m*)** that are registered.

To register process 204(1), an identifier for process 204(1) is provided to process controller 202, along with one or more references to one or more callback functions associated with process 204(1). A single associated callback function may be registered for process 204(1). In such a case, that same callback function will be invoked by the process controller 202 regardless of whether the participation status of the computing node 104 changes from active to passive or passive to active, which means that the callback function has sufficient logic to know when to cause process 204(1) to begin processing, and when to cause process 204(1) to halt processing, depending upon the change in participation status (in such a case, the process controller 202 may provide the new status as an input parameter to the callback function). Alternatively, multiple associated callback functions may be registered for process 204(1), with one callback function being the one that is invoked when the participation status of the computing node 104 changes from active to passive, and another callback function being the one that is invoked when the participation status of the computing node 104 changes from passive to active. In such a case, the process controller 202 will determine which callback function to invoke based upon the change in participation status. The identifier for process 204(1) and the one or more references to the one or more callback functions associated with process 204(1) are stored by the process controller 202.

A similar procedure may be used to register process 204(m). Specifically, an identifier for process 204(m) is provided to process controller 202, along with one or more references to one or more callback functions associated with process 204(m). Process 204(m) may have a single callback function associated therewith, or multiple callback functions associated therewith. The identifier for process 204(m) and the one or more references to the one or more callback functions associated with process 204(m) are stored by the process controller 202.

In one embodiment, after the processes 204(1), 204(m) are registered, the process controller 202 proceeds to determine the current participation status of the computing node 104. The process controller 202 may make this determination in any of the ways described previously (e.g. by obtaining and analyzing registered node information from the request handler 102, by querying the request handler 102, by monitoring requests received from the request handler 102, by receiving a notification from the request handler 102, etc.). After determining the current participation status of the computing node 104, the process controller 202 stores the status as the current status of the computing node 104.

In addition, based upon the current status, the process controller 202 determines whether to cause the registered processes 204(1), 204(m) to begin or halt processing. In one embodiment, as a default, registered processes 204(1), 204(m) are initially in a non-processing state. Thus, if the current status of the computing node 104 is passive, then the process controller 202 may take no action with regard to the registered processes 204(1), 204(m), in which case the registered processes 204(1), 204(m) remain in a non-processing state.

However, if the current status of the computing node 104 is active, then the process controller 202 may cause the registered processes 204(1), 204(m) to begin processing. For process 204(1), the process controller 202 may do this by invoking one of the callback functions associated with process 204(1). If a single callback function was registered for process 204(1), then the process controller 202 may invoke that callback function, and may provide the current status of the computing node 104 as an input parameter to the callback function. In turn, the callback function will cause process 204(1) to begin processing. If multiple callback functions are registered for process 204(1), then the process controller 202 may invoke the callback function that is meant to be invoked when the participation status of the computing node 104 changes from passive to active. In turn, this callback function will cause process 204(1) to begin processing.

The process controller 202 may carry out a similar procedure for process 204(m). If a single callback function was registered for process 204(m), then the process controller 202 may invoke that callback function, and may provide the current status of the computing node 104 as an input parameter to the callback function. In turn, the callback function will cause process 204(m) to begin processing. If multiple callback functions are registered for process 204(m), then the process controller 202 may invoke the callback function that is meant to be invoked when the participation status of the computing node 104 changes from passive to active. In turn, this callback function will cause process 204(m) to begin processing.

In the manner described, the process controller 202 registers processes 204(1), 204(m) and puts them into the proper initial processing state based upon the current participation status of the computing node 104. After that is done, the process controller 202 and the registered processes 204(1), 204(m) are ready for regular operation.

Regular Operation

Figure 3:
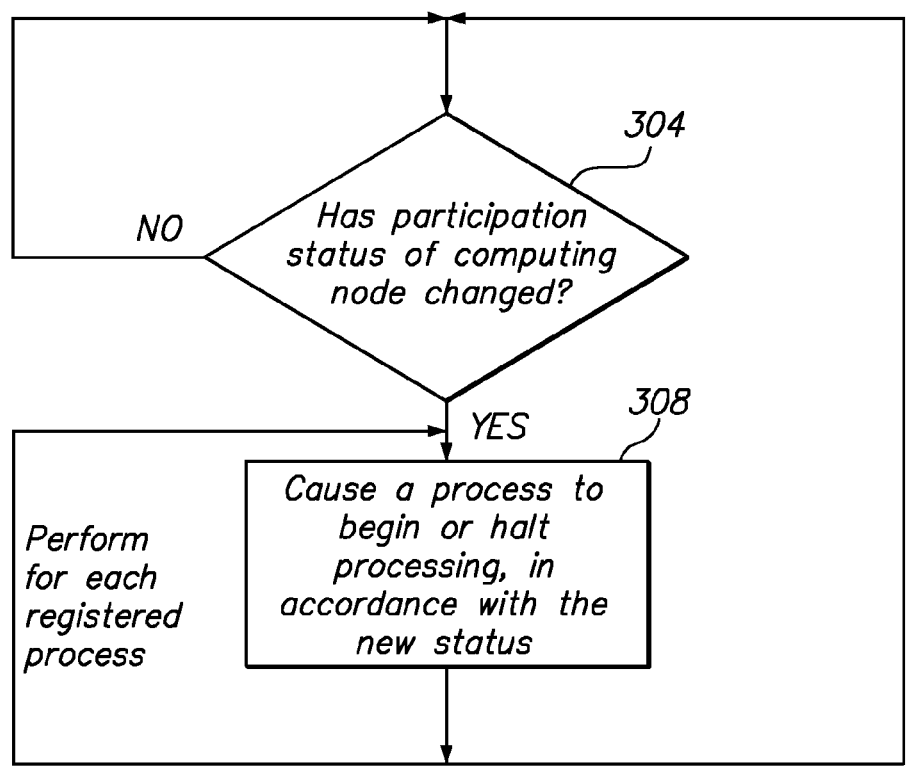
FIG. 3 is a flow diagram illustrating how a process on a computing node may be controlled, in accordance with one embodiment of the present invention.

In one embodiment, during regular operation, the process controller 202 on a computing node 104 may operate in accordance with the flow diagram depicted in FIG. 3. As shown in FIG. 3, the process controller 202 determines (block 304) whether the participation status of the computing node 104 has changed. To do so, the process controller 202 first determines the participation status of the computing node 104. This may be done in any of the ways described previously (e.g. by obtaining and analyzing registered node information from the request handler 102, by querying the request handler 102, by monitoring requests received from the request handler 102, by receiving a notification from the request handler 102, a combination of some or all of these, etc.). The process controller 202 then compares the newly determined status with the previously stored current status to see if the two statuses are different. If so, then a change in participation status has occurred.

If no participation status change has occurred, then the process controller 202 loops back to block 304 to again determine whether the participation status of the computing node 104 has changed. The process controller 202 may perform this check periodically (in the case where a notification is received from the request handler 102, the process controller 202 may learn of a participation status change asynchronously). On the other hand, if the participation status of the computing node 104 has changed from the previously stored current status to a new status, then the process controller 202 stores the new status as the new current status of the computing node 104. In addition, the process controller 202 causes (block 308) one or more processes 204 on the computing node 104 to begin or halt processing, in accordance with the new status. In one embodiment, the operation in block 308 is performed for each of the processes 204 registered with the process controller 202. In the current example, that would be processes 204(1) and 204(m). Process controller 202 may perform the operation of block 308 as follows.

Using the information stored during the registration process, the process controller 202 determines that the registered processes are processes 204(1) and 204(m). Dealing first with process 204(1), the process controller 202 invokes one of the callback functions associated with process 204(1). If a single callback function was associated with process 204(1) during the registration process, then in one embodiment, the process controller 202 invokes that callback function, and provides the new status of the computing node 104 as an input parameter (if so desired, the previously stored current status of the computing node 104 may also be provided as an input parameter). The callback function will then cause process 204(1) to begin or halt operation, depending upon the new status of the computing node 104. In one embodiment, if the participation status of the computing node 104 changed from passive to active, then the callback function will cause process 204(1) to begin processing. If the participation status of the computing node 104 changed from active to passive, then the callback function will cause process 204(1) to halt processing.

If multiple callback functions were associated with process 204(1) during the registration process, then the process controller 202, in one embodiment, will determine how the participation status of the computing node 104 changed (e.g. from passive to active or from active to passive). The process controller 202 will then invoke the proper callback function based upon the change. Specifically, if the participation status of the computing node 104 changed from passive to active, then the process controller 202 will invoke the callback function that is intended to be invoked when the status changes from passive to active. In one embodiment, when this callback function is invoked, it will cause process 204(1) to begin processing. If the participation status of the computing node 104 changed from active to passive, then the process controller 202 will invoke the callback function that is intended to be invoked when the status changes from active to passive. In one embodiment, when this callback function is invoked, it will cause process 204(1) to halt processing. In this manner, the process controller 202 causes process 204(1) to begin or halt processing, in accordance with the new status of the computing node 104.

Process 204(m) may be handled in a similar manner. Specifically, if a single callback function was associated with process 204(m) during the registration process, then in one embodiment, the process controller 202 invokes that callback function, and provides the new status of the computing node 104 as an input parameter (if so desired, the previously stored current status of the computing node 104 may also be provided as an input parameter). The callback function will then cause process 204(m) to begin or halt operation, depending upon the new status of the computing node 104. In one embodiment, if the participation status of the computing node 104 changed from passive to active, then the callback function will cause process 204(m) to begin processing. If the participation status of the computing node 104 changed from active to passive, then the callback function will cause process 204(m) to halt processing.

If multiple callback functions were associated with process 204(m) during the registration process, then the process controller 202, in one embodiment, will determine how the participation status of the computing node 104 changed (e.g. from passive to active or from active to passive). The process controller 202 will then invoke the proper callback function based upon the change. Specifically, if the participation status of the computing node 104 changed from passive to active, then the process controller 202 will invoke the callback function that is intended to be invoked when the status changes from passive to active. In one embodiment, when this callback function is invoked, it will cause process 204(m) to begin processing. If the participation status of the computing node 104 changed from active to passive, then the process controller 202 will invoke the callback function that is intended to be invoked when the status changes from active to passive. In one embodiment, when this callback function is invoked, it will cause process 204(m) to halt processing. In this manner, the process controller 202 causes process 204(m) to begin or halt processing, in accordance with the new status of the computing node 104.

As shown in FIG. 3, process controller 202 performs the operation of block 308 for each of the registered processes. After all of the registered processes are handled, process controller 202 loops back to block 304 to once again determine whether the participation status of the computing node 104 has changed. In the manner described, the process controller 202, in one embodiment, continuously checks for changes in the participation status of the computing node 104, and when such changes are detected, the process controller 202 causes the registered processes to begin or halt processing, based upon the change in participation status. By doing so, the process controller 202 makes it possible to change the processing of processes quickly to adapt to changes in the participation status of the computing node 104.

Hardware Overview

Figure 4:
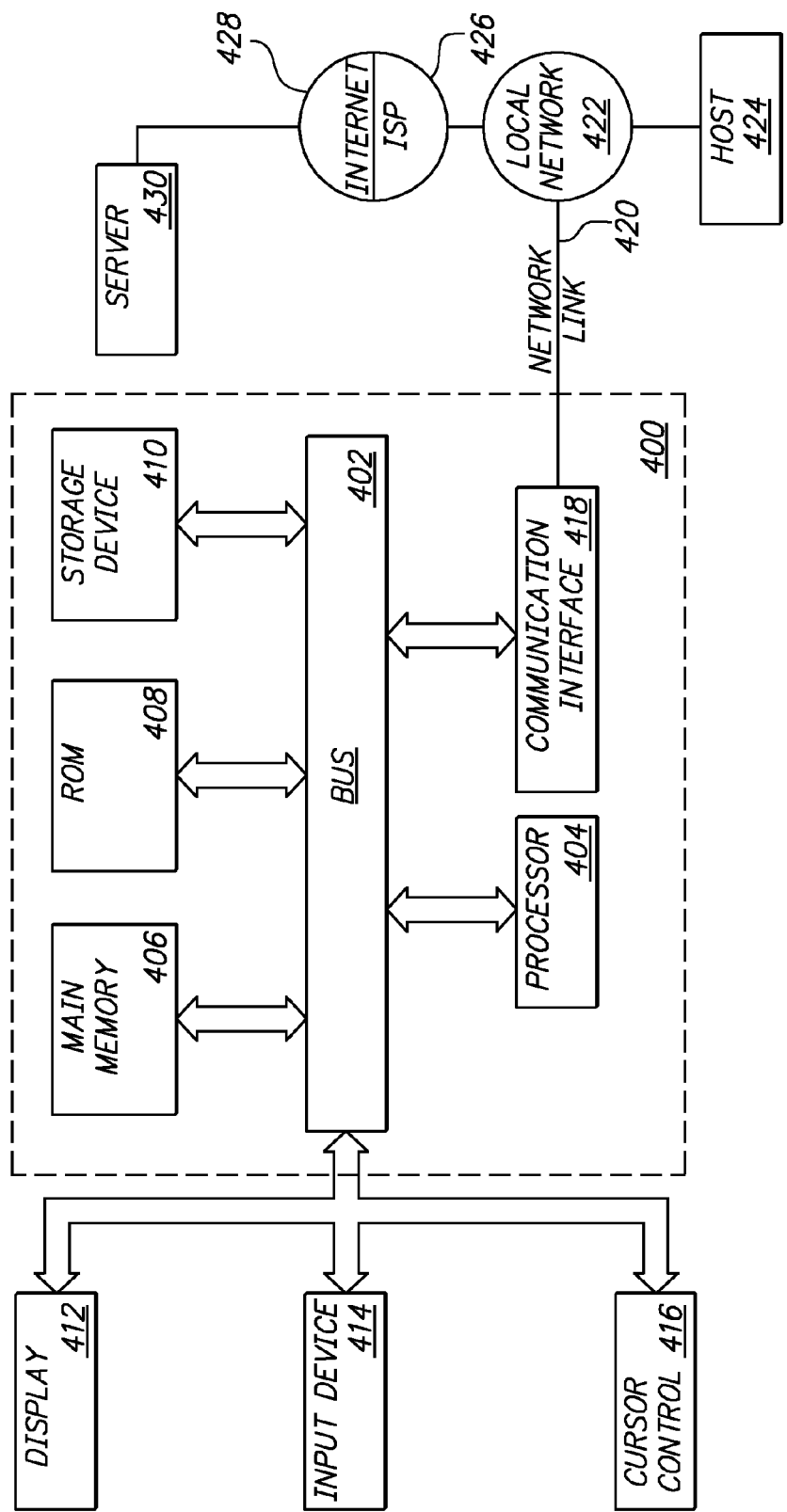
FIG. 4 is a block diagram of a sample computer system that may be used to implement at least a portion of the present invention.

With reference to FIG. 4, there is shown a block diagram of a computer system that may be used to implement one or more of the computing nodes 104 and clients 106 shown in FIG. 1. Computer system 400 includes a bus 402 or other communication mechanism for communicating information, and one or more hardware processors 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques and components (e.g. process controller 202, request handler 102, processes 204, etc.) described herein using customized hard-wired logic, one or more ASICs or FPGAs, firmware and/or program logic which in combination with the computer system causes or programs computer system 400 to be a special-purpose machine. According to one embodiment, the techniques disclosed herein for process controller 202, request handler 102, and processes 204 are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution.

At this point, it should be noted that although the invention has been described with reference to specific embodiments, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims.

What is claimed is:

1. A method, comprising:
   a request handler, executing at a particular node of a plurality of nodes, maintaining participation status information for a set of registered nodes of the plurality of nodes;
   a process controller, executing at a computing node of the plurality of nodes, determining that the participation status information, maintained by the request handler, indicates that that a participation status of the computing node is an active participation status;
   after the process controller determines that the participation status information, maintained by the request handler, indicates that that the participation status of the computing node is an active participation status, the process controller determining that the participation status information, maintained by the request handler, indicates that that the participation status of the computing node is a passive participation status;
   in response to determining that the participation status of the computing node is a passive participation status, after determining that the participation status of the computing node was an active participation status, the process controller causing a process executing on the computing node to halt processing.

2. The method of claim 1, wherein the process controller determining that the participation status information, maintained by the request handler, indicates that that the participation status of the computing node is an active participation status comprises:
   obtaining information from the request handler indicating that the request handler considers the computing node to be a node that participates in processing requests from the request handler.

3. The method of claim 1, wherein the process controller determining that the participation status information, maintained by the request handler, indicates that that the participation status of the computing node is an active participation status comprises:

determining a number of requests that have been received by the computing node from the request handler over a certain period of time; and determining, based at least in part upon the number of requests that have been received by the computing node from the request handler over the certain period of time, that the participation status information, maintained by the request handler, indicates that that the participation status of the computing node is an active participation status.

4. The method of claim 1, further comprising:

registering the process with the process controller to produce a process registration;

wherein causing the process to halt processing is based, at least in part, on the process registration.

5. The method of claim 4, wherein registering the process comprises registering a callback function associated with the process; and wherein causing the process to halt processing comprises invoking the callback function.

6. The method of claim 1, wherein the method further comprises registering a callback function associated with the process; and wherein causing the process on the computing node to halt processing comprises invoking the callback function.

7. The method of claim 1, further comprising:

after the process controller determines that the participation status information, maintained by the request handler, indicates that that the participation status of the computing node is a passive participation status, the process controller determining that the participation status information, maintained by the request handler, again indicates that that the participation status of the computing node is an active participation status;

in response to determining that the participation status information again indicates that that the participation status of the computing node is an active participation status, the process controller causing the process executing on the computing node to begin processing.

8. The method of claim 7, further comprising:

registering a plurality of callback functions associated with the process;

wherein the plurality of callback functions includes a begin callback function;

wherein causing the process executing on the computing node to begin processing comprises invoking the begin callback function to cause the process to begin processing.

9. The method of claim 7, further comprising:

registering a callback function associated with the process; and wherein causing the process on the computing node to halt processing comprises invoking the callback function; and wherein causing the process on the computing node to begin processing comprises invoking the callback function.

10. The method of claim 7, wherein the method further comprises registering a callback function associated with the process;

wherein causing the process on the computing node to begin processing comprises invoking the callback function to cause the process to begin processing.

11. The method of claim 1, wherein the method further comprises registering a plurality of callback functions associated with the process;

wherein the plurality of callback functions includes a halt callback function;

wherein causing the process on the computing node to halt processing comprises invoking the halt callback function to cause the process to halt processing.

12. One or more computer readable storage media storing one or more sequences of instructions which, when executed by one or more processors, cause:

a request handler, executing at a particular node of a plurality of nodes, maintaining participation status information for a set of registered nodes of the plurality of nodes;

a process controller, executing at a computing node of the plurality of nodes, determining that the participation status information, maintained by the request handler, indicates that that a participation status of the computing node is an active participation status;

after the process controller determines that the participation status information, maintained by the request handler, indicates that that the participation status of the computing node is an active participation status, the process controller determining that the participation status information, maintained by the request handler, indicates that that the participation status of the computing node is a passive participation status;

in response to determining that the participation status of the computing node is a passive participation status, after determining that the participation status of the computing node was an active participation status, the process controller causing a process executing on the computing node to halt processing.

13. The one or more computer readable storage media of claim 12, wherein the process controller determining that the participation status information, maintained by the request handler, indicates that that the participation status of the computing node is an active participation status comprises:

obtaining information from the request handler indicating that the request handler considers the computing node to be a node that participates in processing requests from the request handler.

14. The one or more computer readable storage media of claim 12, wherein the process controller determining that the participation status information, maintained by the request handler, indicates that that the participation status of the computing node is an active participation status comprises:

determining a number of requests that have been received by the computing node from the request handler over a certain period of time; and determining, based at least in part upon the number of requests that have been received by the computing node from the request handler over the certain period of time, that the participation status information, maintained by the request handler, indicates that that the participation status of the computing node is an active participation status.

15. The one or more computer readable storage media of claim 12, wherein the one or more sequences of instructions further comprise instructions which, when executed by the one or more processors, cause:

registering the process with the process controller to produce a process registration;

wherein causing the process to halt processing is based, at least in part, on the process registration.

16. The one or more computer readable storage media of claim 15, wherein registering the process comprises registering a callback function associated with the process; and wherein causing the process to halt processing comprises invoking the callback function.

17. The one or more computer readable storage media of claim 12,
wherein the one or more sequences of instructions further comprise instructions which, when executed by the one or more processors, cause registering a callback function associated with the process; and
wherein causing the process on the computing node to halt processing comprises invoking the callback function.

18. The one or more computer readable storage media of claim 12, wherein the one or more sequences of instructions further comprise instructions which, when executed by one or more processors, cause:
after the process controller determines that the participation status information, maintained by the request handler, indicates that that the participation status of the computing node is a passive participation status, the process controller determining that the participation status information, maintained by the request handler, again indicates that that the participation status of the computing node is an active participation status;
in response to determining that the participation status information again indicates that that the participation status of the computing node is an active participation status, the process controller causing the process executing on the computing node to begin processing.

19. The one or more computer readable storage media of claim 12,
wherein the one or more sequences of instructions further comprise instructions which, when executed by the one or more processors, cause registering a plurality of callback functions associated with the process;
wherein the plurality of callback functions includes a halt callback function;
wherein causing the process on the computing node to halt processing comprises invoking the halt callback function to cause the process to halt processing.

20. The one or more computer readable storage media of claim 18,
wherein the one or more sequences of instructions further comprise instructions which, when executed by the one or more processors, cause registering a callback function associated with the process;
wherein causing the process on the computing node to begin processing comprises invoking the callback function to cause the process to begin processing.

21. The one or more computer readable storage media of claim 18, wherein the one or more sequences of instructions further comprise instructions which, when executed by one or more processors, cause:
registering a plurality of callback functions associated with the process;
wherein the plurality of callback functions includes a begin callback function;
wherein causing the process executing on the computing node to begin processing comprises invoking the begin callback function to cause the process to begin processing.

22. The one or more computer readable storage media of claim 18, wherein the one or more sequences of instructions further comprise instructions which, when executed by one or more processors, cause:
registering a callback function associated with the process; and
wherein causing the process on the computing node to halt processing comprises invoking the callback function; and
wherein causing the process on the computing node to begin processing comprises invoking the callback function.

* * * * *